(12) United States Patent
Ge et al.

(10) Patent No.: US 11,958,719 B2
(45) Date of Patent: Apr. 16, 2024

(54) ACTION STATE DETECTION METHOD AND SYSTEM FOR ELEVATOR BRAKE

(71) Applicants: Changshu Institute of Technology, Suzhou (CN); Dongnan Elevator Co., Ltd., Suzhou (CN)

(72) Inventors: Yang Ge, Suzhou (CN); Fusheng Zhang, Suzhou (CN); Anbo Jiang, Suzhou (CN); Lingyun Ma, Suzhou (CN); Zhen Zhao, Suzhou (CN); Jianxin Ding, Suzhou (CN); Jiancong Qin, Suzhou (CN); Yong Ren, Suzhou (CN); Guodong Sun, Suzhou (CN)

(73) Assignees: Changshu Institute of Technology, Suzhou (CN); Dongnan Elevator Co., Ltd., Suzhou (CN)

( * ) Notice: Subject to any disclaimer, the term of this patent is extended or adjusted under 35 U.S.C. 154(b) by 0 days.

(21) Appl. No.: 18/340,021

(22) Filed: Jun. 22, 2023

(65) Prior Publication Data
US 2023/0331515 A1    Oct. 19, 2023

(30) Foreign Application Priority Data
Jan. 6, 2023    (CN) .......................... 202310015115.7

(51) Int. Cl.
*B66B 1/32*    (2006.01)
*B66B 1/28*    (2006.01)

(52) U.S. Cl.
CPC ............... *B66B 1/32* (2013.01); *B66B 1/285* (2013.01)

(58) Field of Classification Search
CPC .................................. B66B 1/32; B66B 1/285
See application file for complete search history.

(56) References Cited

U.S. PATENT DOCUMENTS

| 9,586,569 B2 * | 3/2017 | Drewes ................... B60T 8/172 |
| 2006/0273658 A1 * | 12/2006 | Halassy-Wimmer ..... B60T 8/00 303/191 |
| 2008/0264729 A1 | 10/2008 | Mustalahti et al. |
| 2010/0213016 A1 | 8/2010 | Hult et al. |
| 2015/0259175 A1 | 9/2015 | West et al. |
| 2020/0325949 A1 * | 10/2020 | Park ...................... B66B 5/0093 |

OTHER PUBLICATIONS

CNIPA, Notification of First Office Action for Chinese application CN202310015115.7, dated Mar. 14, 2023.
CNIPA, Notification to grant patent right for Chinese application CN202310015115.7, dated Mar. 28, 2023.

* cited by examiner

*Primary Examiner* — Jeffrey Donels

(57) ABSTRACT

The present invention relates to the field of elevator braking, in particular to an action state detection method and system for an elevator brake, comprising: acquiring matching pairs of brake linings in the same braking state; constructing normal record data sets based on the matching pairs; grouping the normal record data sets based on braking power corresponding to samples in the normal record data sets to determine a median of elevator running speed corresponding to the samples in each group; dividing the operating state levels of the elevator brake according to the size of the median; constructing a data training set; training a constructed network model to obtain a trained network model; acquiring the operating state levels of an elevator to be detected by the trained network model, evaluating the elevator brake according to the operating state levels, and controlling the elevator.

7 Claims, 1 Drawing Sheet

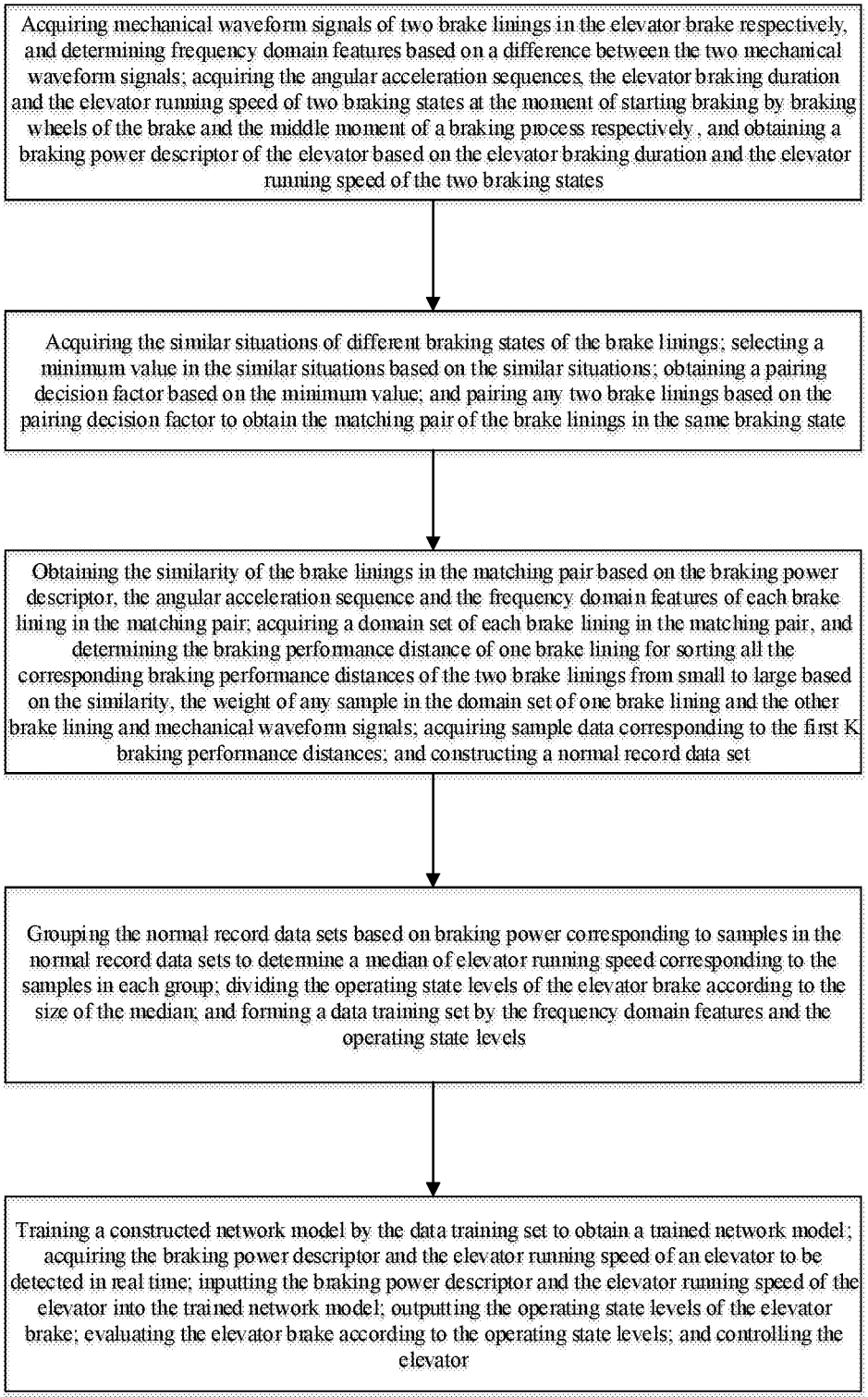

ACTION STATE DETECTION METHOD AND SYSTEM FOR ELEVATOR BRAKE

TECHNICAL FIELD

The present invention relates to the field of elevator braking, in particular to an action state detection method and system for an elevator brake.

BACKGROUND

An elevator brake is an important device to ensure the safety of an elevator, and the safety and reliability of the brake performance is the basis to ensure the safe and smooth operation of the elevator. The elevator brake has the main functions of keeping a car stationary when the elevator stops running, and making the running elevator automatically brake the car in the case of power failure. Its important position is like a brake device of an automobile, and there is no doubt to ensure the safety standards of its performance. The performance of the elevator brake is generally detected by a type test method on the whole elevator in China. This method is one-sided in detected parameters and cannot detect the performance of the elevator brake comprehensively and accurately because of the external influences of the equipment structure.

For the debugging and maintenance of the brake, an elevator manufacturer gives more clear and detailed specifications, but in the process of manual debugging, the distances and positions of brake linings and the selection of consumables are different. Thus, it is difficult to achieve a unified standard in the maintenance process.

SUMMARY

To solve the above technical problems, the purpose of the present invention is to provide an action state detection method and system for an elevator brake. The adopted technical solution is specifically as follows:

The present invention provides an action state detection method for an elevator brake, comprising the following steps:
  acquiring mechanical waveform signals of two brake linings in the elevator brake respectively, and determining frequency domain features based on a difference between the two mechanical waveform signals; at the same time, acquiring the angular acceleration data, the elevator braking duration and the elevator running speed of two braking states at the moment of starting braking by braking wheels of the brake and the middle moment of a braking process, respectively, and obtaining a braking power descriptor of the elevator based on the elevator braking duration and the elevator running speed of the two braking states; and constructing an angular acceleration sequence of braking according to the angular acceleration data of the two braking states;
  acquiring the similar situations of different braking states of the brake linings; selecting a minimum value in the similar situations based on the similar situations; obtaining a pairing decision factor based on the minimum value; and pairing any two brake linings based on the pairing decision factor to obtain the matching pair of the brake linings in the same braking state;
  obtaining the similarity of the brake linings in the matching pair based on the braking power descriptor, the angular acceleration sequence and the frequency domain features of each brake lining in the matching pair; acquiring a domain set of each brake lining in the matching pair, and determining the braking performance distance of one brake lining for sorting all the corresponding braking performance distances of the two brake linings from small to large based on the similarity, the weight of any sample in the domain set of one brake lining and the other brake lining and mechanical waveform signals; acquiring sample data corresponding to the first K' braking performance distances; and constructing a normal record data set, with K' greater than or equal to 1;
  grouping the normal record data sets based on braking power corresponding to samples in the normal record data sets to determine a median of elevator running speed corresponding to the samples in each group; dividing the operating state levels of the elevator brake according to the size of the median; and forming a data training set by the frequency domain features and the operating state levels;
  training a constructed network model by the data training set to obtain a trained network model;
  acquiring the braking power descriptor and the elevator running speed of an elevator to be detected in real time; inputting the frequency domain features into the trained network model; outputting the operating state levels of the elevator brake; evaluating the elevator brake according to the operating state levels; and controlling the elevator.

Preferably, the acquisition process of the mechanical waveform signals is:
  acquiring the mechanical waveform signals of two brake linings;
  calculating the variances of the stress of the two brake linings, and using the brake lining with a larger variance as an A-side brake lining, and the brake lining with a smaller variance as a B-side brake lining;
  calculating a stress difference between the A-side brake lining and the B-side brake lining to obtain a difference sequence, denoted as the mechanical waveform signal.

Preferably, the similar situation is: the similarity degree of any two brake linings is determined according to the braking duration and the difference sequence of the A-side brake lining and the B-side brake lining:

$$G(p,q)_{AA}=\text{abs}(E_{T_p}-E_{T_q})*DTW(S_{pA},S_{qA})$$

$$G(p,q)_{AB}=\text{abs}(E_{T_p}-E_{T_q})*DTW(S_{pA},S_{qB})$$

$$G(p,q)_{BA}=\text{abs}(E_{T_p}-E_{T_q})*DTW(S_{pB},S_{qA})$$

$$G(p,q)_{BB}=\text{abs}(E_{T_p}-E_{T_q})*DTW(S_{pB},S_{qB})$$

wherein $E_{T_p}$ is the braking time of brake p; $E_{T_q}$ is the braking time of brake q; $S_{pA}$ is the stress sequence of the A-side brake lining of the brake p; $S_{qA}$ is the stress sequence of the A-side brake lining of the brake q; $S_{qB}$ is the stress sequence of the B-side brake lining of the brake q; $S_{pB}$ is the stress sequence of the B-side brake lining of the brake p; DTW( ) is a dynamic time warping function; and abs( ) is an absolute value function.

Preferably, the pairing decision factor is:

$$a = \frac{1}{1+G}$$

wherein G is the minimum value in the similar situation.

Preferably, the braking performance distance is:

$$Q(p', r_K) = \frac{L1(M_{p'}, M_{rK}) * DTW(S_{p'}, S_{rK})}{H(p', r)}$$

wherein Q(p', $r_K$) is the braking performance distance of a neighboring sample $r_K$ of brake lining p' and brake lining r in the matching pair; $M_{p'}$ is the counterweight of the brake lining p'; $S_{p'}$ is the stress sequence of the brake lining p'; $Mr_K$ is the counterweight of the neighboring sample $r_K$; $S_{rK}$ is the stress sequence of the neighboring sample $r_K$ of the brake lining r; DTW( ) is a dynamic time warping function; L1( ) is a norm; and K is the number of the neighboring samples.

Preferably, the operating state levels of the elevator brake are the levels set according to the elevator running speed.

The present invention further provides an action state detection system for an elevator brake, comprising a processor and a memory; the processor is used for performing the steps stored in the memory for implementing the above action state detection method for the elevator brake.

The present invention has the following beneficial effects:

In the solution of the present invention, the related data of the elevator brake is detected, and analysis is performed according to the related data, which can model and analyze all elevators as the basis from the structural characteristics and the process characteristics of the brake and judge each elevator brake jointly to avoid the one-sidedness of overhaul and detection, so as to improve the accuracy of maintenance, upkeep and performance monitoring.

DESCRIPTION OF DRAWINGS

To more clearly describe the technical solutions and the advantages in embodiments of the present invention or in prior art, the drawings required to be used in the description of the embodiments or the prior art will be simply presented below. Apparently, the drawings in the following description are merely some embodiments of the present invention, and for those ordinary skilled in the art, other drawings can also be obtained according to these drawings without contributing creative labor.

FIG. 1 is a flow chart of an action state detection method for an elevator brake of the present invention.

DETAILED DESCRIPTION

To further explain the technical means adopted by the present invention to achieve the intended invention purpose and the effect, the solution based on the present invention, specific implementation modes, structures, features and effects are explained in detail below in combination with drawings and preferred embodiments. In the following description, different "one embodiment" or "another embodiment" shall not necessarily refer to the same embodiment. In addition, the specific features, structures or characteristics in one or more embodiments can be combined in any appropriate form.

Unless otherwise defined, all technical and scientific terms used herein have the same meanings as those generally understood by those skilled in the art in the present invention.

A scenario of the present invention is an elevator that needs emergency braking.

Specifically, taking the elevator installed in a community as an example, an action state detection method for an elevator brake provided by the present invention is described, as shown in FIG. 1, comprising the following steps:

Firstly, acquiring mechanical waveform signals of two brake linings in the elevator brake respectively, and determining frequency domain features based on a difference between the two mechanical waveform signals; at the same time, acquiring the angular acceleration data, the elevator braking duration and the elevator running speed of two braking states at the moment of starting braking by braking wheels of the brake and the middle moment of a braking process, respectively, and obtaining a braking power descriptor of the elevator based on the elevator braking duration and the elevator running speed of the two braking states; and constructing an angular acceleration sequence of braking according to the angular acceleration data of the two braking states; and constructing an angular acceleration sequence of braking according to the angular acceleration data of the two braking states.

In the present embodiment, the brake linings (i.e., brake shoe assemblies) in the recorded data of the brake are monitored to determine the running state, wherein a stress sensor is integrated on the bottom surface of a spring of the brake linings; due to different sliding and compression conditions in the braking process, the change of stress may vary; and for a braking action, the stress borne by the brake linings presents different mechanical effects due to the physical limitations of braking wheels and brake skin of the brake linings. For the stress of the brake linings, when a braking signal is initiated, mechanical waveform signals S and instantaneous microvibration component Vclamp are constructed for the left and right brake linings respectively.

The acquisition process of the above mechanical waveform signals S is:

acquiring the mechanical signals of two brake linings, wherein the actions of the two brake linings are mutually independent;

calculating the variances of the mechanical signals in a set time period of each brake lining, and using the brake lining with a larger variance as A side, and the brake lining with a smaller variance as B side;

calculating a stress difference between the A side and the B side to obtain a difference sequence, denoted as the mechanical waveform signal S.

The mechanical waveforms in the above embodiment can uniformly represent uniform features caused by different braking directions and stress bias.

It should be indicated that because two brake linings are placed symmetrically, there may be certain bias in an execution process; and the influence of the rotation directions of the braking wheels on the load of the brake linings and the wear mode are non-negligible. For different directions of the braking wheels caused by going up and down by the elevator, for one brake lining, there is always one brake lining that firstly applies a larger braking effect to the braking wheel. Therefore, for spring stress, the stress of the two brake linings is collected at a speed of 500 Hz, and the variances of the two are counted during the first 20% of time in the braking process. The brake lining with a larger variance is used as A side, and the other side is B side. Because there is one brake lining between the steering and clamping directions of the braking wheels, which can directly conduct the frictional force of the braking wheels upward to braking arms, and the frictional force borne by the brake lining is greater at first, the variance of the change of the stress borne by the spring in the early stage is correspondingly larger. It should be clear that the above hypothesis is satisfied only when the clamping forces of the braking linings are the same. Based on this hypothesis, the stress difference in the whole braking process of the A side and the B side is calculated.

In the present embodiment, the waveform signal of the obtained mechanical waveform signal S is subjected to frequency domain conversion, wherein the range of frequency domain is 0-200 Hz, and every 10 Hz is used as a frequency component, to obtain the frequency domain information vector feature Vclamp of the waveform signal, wherein the frequency domain conversion uses Fourier transform known in the industry without windowing. The specific conversion process will not be described in detail here.

It should be indicated that there are two brake linings. Considering that the braking wheels generally have the problems of unrounding and eccentricity, the information of two stresses is processed respectively to obtain the mechanical waveform signals and waveform frequency domain features of the brake clamping effect.

In the present embodiment, the related data of the braking wheels in the brake are obtained, such as angular acceleration sequence, elevator braking duration and elevator running speed.

The angular acceleration sequence is measured at the moment when the braking wheel starts braking and the middle moment of the braking process, that is, the angular acceleration data $AngAcc_{Start}$ at the moment of starting braking and the angular acceleration data $AngAcc_{out}$ at the middle moment of the braking process are determined during braking, and the angular acceleration sequence of braking is constructed, that is, $AngAcc=(AngAcc_{Start}/AngAcc_{out})$.

Meanwhile, the braking power of the braking wheels is calculated according to the braking duration of the elevator and the elevator running speed, which is specifically as follows:

The counterweight carried by the brake is obtained. In the present embodiment, for an elevator of 1000 Kg, the weight of the counterweight=the weight of the car+(0.4-0.5)*1000 kg. In the present embodiment, the weight of the car is 300 Kg, so the mass of the counterweight is: M=(0.4-0.5)*1000 kg+300 Kg.

The braking power is calculated according to the above counterweight, the braking duration of the elevator and the elevator running speed;

$$P_0 = \frac{M*E_V}{2*E_{T_0}}, P_1 = \frac{M*E_V}{2*E_{T_1}}$$

wherein $E_{T_0}$ is the time duration when the elevator running speed E v reaches half the running speed, and $E_{T_1}$ is the time duration when the elevator stops completely after reaching $E_{T_0}$; and then an equivalent braking power feature descriptor $P=(P_0, P_1)$ is obtained.

Secondly, the similar situations of different braking states of the brake linings are acquired; a minimum value in the similar situations is selected based on the similar situations; a pairing decision factor is obtained based on the minimum value; and any two brake linings are paired based on the pairing decision factor to obtain the matching pair of the brake linings in the same braking state.

The similar situations in the present embodiment comprise:

$$G(p,q)_{AA}=\text{abs}(E_{T_p}-E_{T_q})*DTW(S_{pA},S_{qA})$$

$$G(p,q)_{AB}=\text{abs}(E_{T_p}-E_{T_q})*DTW(S_{pA},S_{qB})$$

$$G(p,q)_{BA}=\text{abs}(E_{T_p}-E_{T_q})*DTW(S_{pB},S_{qA})$$

$$G(p,q)_{BB}=\text{abs}(E_{T_p}-E_{T_q})*DTW(S_{pB},S_{qB})$$

$$G(p,q)=\min(G(p,q)_{AA},G(p,q)_{AB},G(p,q)_{BA},G(p,q)_{BB})$$

wherein $E_{T_p}$ is the braking time of brake p; $E_{T_q}$ is the braking time of brake q; $S_{p_A}$ is the stress sequence of the A-side brake lining of the brake p; $S_{q_A}$ is the stress sequence of the A-side brake lining of the brake q; $S_{q_B}$ is the stress sequence of the B-side brake lining of the brake q; $S_{p_B}$ is the stress sequence of the B-side brake lining of the brake p; DTW( ) is a dynamic time warping function; and abs( ) is an absolute value function.

The above G(p,q) represents a minimum distance that can be obtained after the comparison positions of the brake linings AB are listed in the samples of the braking states of the AB side brake linings when the samples of the braking states of the p brake lining and the samples of the braking states of the q brake lining are paired.

It should be indicated that the data on which the above similar situations are based can be the recorded data of the brake linings of a plurality of elevator brakes, or the recorded data corresponding to multiple braking states of the same elevator brake. The reason for calculating the above similar situations is that multiple braking states of the elevator brake can be obtained through analysis of big data, which provides rich data for the subsequent training of the network model.

The pairing decision factor in the present embodiment is $$a = \frac{1}{1+G}.$$

If the distance is smaller, the matrix Adjacency={a(p,q)} is defined. Then, matrix A is used as a parameter to obtain the index result of the decision matrix G through K-M algorithm, so that the sum of elements removed is the maximum when only one element is removed from each row and each column in the matrix Adjacency. The mechanical waveform signals of the two brake linings are listed, so that the nearest matching pair is obtained based on the K-M algorithm.

Thus, the matching pair with some similar mechanical waveform signals is obtained. The function of the matching pair is to explore whether the global operation situations of the matched samples are different from that of one braking arm.

Then, the similarity of the brake linings in the matching pair are obtained based on the braking power descriptor, the angular acceleration sequence and the frequency domain features of each brake lining in the matching pair; a domain set of each brake lining in the matching pair is acquired, and the braking performance distance of one brake lining is determined for sorting all the corresponding braking performance distances of the two brake linings from small to large based on the similarity, the weight of any sample in the domain set of one brake lining and the other brake lining and mechanical waveform signals; sample data corresponding to the first K' braking performance distances are acquired; and a normal record data set is constructed, with K' greater than or equal to 1. The similarity in the present embodiment is:

$$H(p',r)=D_{cos}(P_{p'},P_r)+D_{cos}(AngAcc_{p'},AngAcc_r)+D_{cos}(V_{clamp_{p'}},V_{clamp_r})$$

wherein $P_{p'}$ is the braking power of the brake lining p' in the matching pair; P r is the braking power of the brake lining r in the matching pair; $AngAcc_{p'}$ is the angular acceleration sequence of the brake lining p' in the matching pair; $AngAcc_r$ is the angular acceleration sequence of the brake lining r in the matching pair; $V_{clamp_{p'}}$ is the frequency domain feature of the brake lining p' in the matching pair; and $V_{clamp_r}$ is the frequency domain feature of the brake lining r in the matching pair.

Wherein H can comprehensively evaluate the similarity index of performance according to the similarity of the braking acceleration and the angular acceleration process of the braking process, and the corresponding frequency component of the brake linings, wherein Dcos is normalized cosine similarity. When H is close to 3:
- In two records, the powers of two stages in the braking process are very similar;
- In two records, the angular acceleration sequences at the moment of starting braking by the braking wheels and the middle moment of a braking process during the braking are similar, that is, the braking effects between the brake linings and the braking wheels are similar;
- In two records, the frequency components brought by the mechanical waveform signals of the clamping effects of the brake linings are similar.

Through the evaluation of the three relations, it can be determined whether the mechanical performance of the braking process is as similar as possible.

In the matching pair, for the matching sample r of the brake lining p', r has K neighboring samples; and the Kth neighboring sample is $r_K$. To construct the nearest neighbor relationship, the braking performance distance Q is calculated, and then the neighboring samples among the K neighboring samples are determined.

$$Q(p', r_K) = \frac{L1(M_{p'}, M_{rK}) * DTW(S_{p'}, S_{rK})}{H(p', r)}$$

Wherein $Q(p', r_K)$ is the braking performance distance of the neighboring sample $r_K$ of brake lining p' and brake lining r in the matching pair; $M_{p'}$ is the counterweight of the brake lining p'; $S_{p'}$ is the stress sequence of the brake lining p'; $M_{rK}$ is the counterweight of $r_K$ in the domain set; $S_{rK}$ is the stress of the neighboring sample $r_K$ of the brake lining r; DTW( ) is a dynamic time warping function; and L1( ) is a norm.

The value of K is 5. The value specifically depends on the number of the brake linings with similar and normal performance. If K is larger, it is easier to select and eliminate the situation that the braking performance distance is relatively large, and the remaining sample data forms the normal record data set. Of course, an implementer can try the value of K according to the actual number of records and select an appropriate value of K. The smaller K is, the higher the sample quality of the normal record data set is, but the smaller the number is.

If the braking performance distances are relatively large, the braking performance distances are sorted in the order from small to large, and the larger data after sorting is acquire. In the present embodiment, samples with top 20% of braking performance distances are generally selected as elimination objects, and the remaining sample data form the normal record data set, that is, the value of K' in the above step is K-20% K, and K' is greater than or equal to 1.

Similarly, the braking performance distance of the brake lining r is calculated to obtain Q(r, p' K), wherein p' K is the sample of K neighboring samples of the brake lining p'. For the samples of the brake lining p', when the value of Q(p', $r_K$) is larger, it is considered that the record of the matching pair is not normal. For the relationship between Q(p', $r_K$) and Q(r, p' K) of each matching pair: the samples with the top 20% of the braking performance distance in all records are eliminated, and a normal record data set DS is constructed, wherein H(p', r) affects the value of the braking performance distance Q. The larger H(p', r) is, the smaller the braking performance distance Q is. Therefore, there is a very high probability that the eliminated samples are uncommon samples, and then the normal record data set corresponding to each braking state is obtained. It should be indicated that one matching pair represents one similar braking state, and different matching pairs represent different braking states. It should be noted that the data in the normal record data set DS are not matching pairs, but all records corresponding to the matching pairs.

It should be indicated that H(p', r) is local analysis for the similarity between two brake lining samples, and Q(p', $r_K$) and Q(r, p' K) are further similarity judgment for two brake linings and neighboring samples of the corresponding brake linings respectively. Theoretically, if one of the brake linings is similar to the neighboring sample, then the other brake lining in the matching pair should also be similar to the neighboring sample of one of the brake linings to verify the matching condition of the two brake linings in the matching pair.

Moreover, the normal record data sets are grouped based on braking power corresponding to samples in the normal record data sets to determine a median of elevator running speed corresponding to the samples in each group; the operating state levels of the elevator brake are divided according to the size of the median; and a data training set is formed by the frequency domain features Vclamp and the operating state levels.

In the present embodiment, the acquired normal sample data sets in each braking state are grouped by a DBSCAN clustering algorithm according to different braking powers in the normal record data sets DS.

The medians of the elevator running speed EV in groups are acquired based on the groups, to sort the medians of the elevator running speed EV in groups and divide the operating state levels of the elevator brake, so as to achieve the purpose of automatically dividing a plurality of levels. The operating state levels actually sort the elevator running speed from large to small, and give the corresponding sorting number for each group, as the corresponding operating state levels, such as a first operating state level, a second operating state level and so on, up to the Nth operating state level, wherein N is the sorting number corresponding to the quantity of the elevator running speed in each group.

A data training set is formed by the frequency domain features Vclamp and the operating state levels.

Finally, a constructed network model is trained by the data training set to obtain a trained network model.

The braking power descriptor and the elevator running speed of an elevator to be detected are acquired in real time; the braking power descriptor and the elevator running speed of the elevator are inputted into the trained network model; the operating state levels of the elevator brake are outputted; the elevator brake is evaluated according to the operating state levels; and the elevator is controlled.

The network model constructed in the present embodiment is an OCSVM (OneClass SVM) model, wherein a kernel function uses an RBF function which is used for fitting the nonlinear boundary around the Vclamp dense region of each class so that the remaining points can be separated into outliers.

The OCSVM model is trained based on the data training set, wherein the input is the operating state level and the output is the frequency domain feature Vclamp. So far, the OCSVM model can be trained for each group, that is, each operating state level. Then, each elevator brake finds a new closest OCSVM according to the own speed. This OCSVM is used for judging whether the Vclamp in the subsequent braking action is normal.

It should be indicated that the OCSVM model corresponding to each group can eliminate large samples and acquire the trained OCSVM model based on the constructed training data set of each group; and meanwhile, the trained OCSVM can learn relatively normal sample features at different speeds and masses based on different brake lining performance modes, so as to detect the abnormal state of the elevator.

In the present embodiment, the OCSVM model of each elevator based on each operating state level of the brake is obtained, and the new test record is inputted into the OCSVM model of the most similar speed level, so as to judge whether the record data of the brake reflects a bad clamping state. When the elevator is in the bad clamping state, the speed of the elevator before stopping is controlled and reduced to a slower level in the operating state level corresponding to the OCSVM model to ensure the safety of braking. Based on this, the slower speed is matched and the corresponding secondary judgment of the OCSVM model is conducted. When the secondary judgment still determines the bad clamping state, it is considered that the braking system needs to be replaced to stop the service. On the contrary, the elevator continues to run at a lower speed to wait for maintenance. It should be indicated that the above operating state level corresponds to the elevator speed.

In fact, the solution of the present invention provides an action state detection method. On the one hand, error reporting and missing reporting caused by extensive detection of the traditional sensor is avoided; and on the other hand, the present invention provides sufficient and necessary detailed information and detection results for overhaul, maintenance, and operation and maintenance management.

The present invention further provides an action state detection system for an elevator brake, comprising a processor and a memory; the processor is used for performing the steps stored in the memory for implementing the above action state detection method for the elevator brake. The embodiments of the action state detection method for the elevator brake have been introduced in the above method embodiments, and thus will be not repeated here.

The above embodiments are only used for describing the technical solution of the present application rather than limiting the same. Although the present application is described in detail by referring to the above embodiments, those ordinary skilled in the art should understand that: the technical solution recorded in each of the above embodiments can be still amended, or some technical features therein can be replaced equivalently. These amendments or replacements do not enable the essence of the corresponding technical solution to depart from the spirit and the scope of the technical solution of each embodiment of the present application, and should be included within the protection scope of the present application.

The invention claimed is:
1. An action state detection method for an elevator brake having brake linings, comprising the following steps:
acquiring mechanical waveform signals of two of the brake linings in the elevator brake respectively, and determining frequency domain features based on a difference between the two mechanical waveform signals; at the same time, acquiring angular acceleration data of braking wheels in the brake, the elevator braking duration and the elevator running speed of two braking states at the moment of starting braking by the braking wheels in the brake and the middle moment of a braking process, respectively, and obtaining a braking power descriptor of the elevator based on the elevator braking duration and the elevator running speed of the two braking states; and constructing an angular acceleration sequence of braking according to the angular acceleration data of the two braking states;
acquiring degrees of similarity of different braking states of the brake linings; selecting a minimum value in the degrees of similarity based on the degrees of similarity; obtaining a pairing decision factor based on the minimum value; and pairing any two of the brake linings based on the pairing decision factor to obtain a matching pair of the brake linings in the same braking state;
obtaining the degrees of similarity of the brake linings in the matching pair based on the braking power descriptor, the angular acceleration sequence and the frequency domain features of each of the brake linings in the matching pair; acquiring a domain set of each of the brake linings in the matching pair, and determining the braking performance distance of any of the brake linings for sorting all the corresponding braking performance distances of the two brake linings from small to large based on the degrees of similarity, the weight of any sample in the domain set of one brake lining and the other brake lining and mechanical waveform signals; acquiring sample data corresponding to the first K' braking performance distances; and constructing a normal record data set, with K' greater than or equal to 1;
grouping the normal record data sets based on braking power corresponding to samples in the normal record data sets to determine a median of elevator running speed corresponding to the samples in each group; dividing the operating state levels of the elevator brake according to the size of the median; and forming a data training set by the frequency domain features and the operating state levels;
training a constructed network model by the data training set to obtain a trained network model;
acquiring the braking power descriptor and the elevator running speed of an elevator to be detected in real time; inputting the braking power descriptor and the frequency domain features of the elevator into the trained network model; outputting the operating state levels of the elevator brake; evaluating the elevator brake according to the operating state levels; and controlling the elevator.
2. The action state detection method for the elevator brake according to claim 1, wherein the acquisition process of the mechanical waveform signals is:
acquiring the stress sequences of the two of the brake linings;
calculating the variances of the stress sequences of the two of the brake linings, and using the brake lining with a larger variance as an A-side brake lining, and the brake lining with a smaller variance as a B-side brake lining;

calculating a stress difference between the A-side brake lining and the B-side brake lining to obtain a difference sequence, denoted as the mechanical waveform signal.

3. The action state detection method for the elevator brake according to claim 2, wherein the degrees of similarity of the any two of the brake linings are determined according to the braking duration and the difference sequence of the A-side brake lining and the B-side brake lining:

$$G(p,q)_{AA} = abs(E_{T_p} - E_{T_q}) * DTW(S_{P_A}, S_{q_A})$$

$$G(p,q)_{AB} = abs(E_{T_p} - E_{T_q}) * DTW(S_{P_A}, S_{q_B})$$

$$G(p,q)_{BA} = abs(E_{T_p} - E_{T_q}) * DTW(S_{P_B}, S_{q_A})$$

$$G(p,q)_{BB} = abs(E_{T_p} - E_{T_q}) * DTW(S_{P_B}, S_{q_B})$$

wherein $E_{T_p}$ is the braking time of brake p; $E_{T_q}$ is the braking time of brake q; $S_{P_A}$ is the stress sequence of the A-side brake lining of the brake p; $S_{q_A}$ is the stress sequence of the A-side brake lining of the brake q; $S_{q_B}$ is the stress sequence of the B-side brake lining of the brake q; $S_{P_B}$ is the stress sequence of the B-side brake lining of the brake p; DTW( ) is a dynamic time warping function; and abs( ) is an absolute value function.

4. The action state detection method for the elevator brake according to claim 1, wherein the pairing decision factor is:

$$a = \frac{1}{1+G}$$

wherein G is the minimum value in the degrees of similarity.

5. The action state detection method for the elevator brake according to claim 1, wherein the braking performance distance is:

$$Q(p', r_K) = \frac{L1(M_{p'}, M_{rK}) * DTW(S_{p'}, S_{rK})}{H(p', r)}$$

wherein $Q(p', r_K)$ is the braking performance distance of a neighboring sample $r_K$ of brake lining p' and brake lining r in the matching pair; $M_{p'}$ is the counterweight of the brake lining p'; $S_{p'}$ is the stress sequence of the brake lining p'; $Mr_K$ is the counterweight of the neighboring sample $r_K$; $S_{r_K}$ is the stress sequence of the neighboring sample $r_K$ of the brake lining r; DTW( ) is a dynamic time warping function; L1( ) is a norm; and K is the number of the neighboring samples.

6. The action state detection method for the elevator brake according to claim 1, wherein the operating state levels of the elevator brake are the levels set according to the elevator running speed.

7. An action state detection system for an elevator brake, comprising a processor and a memory, wherein the processor is used for performing the steps stored in the memory for implementing the action state detection method for the elevator brake in claim 1.

* * * * *